(12) United States Patent
Chen

(10) Patent No.: US 7,096,537 B2
(45) Date of Patent: Aug. 29, 2006

(54) ADJUSTABLE HINGE

(75) Inventor: Hsin-Liang Chen, Keelung (TW)

(73) Assignee: Benq Corporation, Taoyuan (TW)

( * ) Notice: Subject to any disclaimer, the term of this patent is extended or adjusted under 35 U.S.C. 154(b) by 0 days.

(21) Appl. No.: 11/131,086

(22) Filed: May 17, 2005

(65) Prior Publication Data
US 2005/0253358 A1 Nov. 17, 2005

(30) Foreign Application Priority Data
May 17, 2004 (TW) .............................. 93113829 A

(51) Int. Cl.
*E05D 11/10* (2006.01)
(52) U.S. Cl. .......................................... 16/327; 16/330
(58) Field of Classification Search ................. 16/327, 16/328, 330, 303, 331, 332; 455/575.1, 575.3; 379/433.13, 434; 361/683, 803
See application file for complete search history.

(56) References Cited

U.S. PATENT DOCUMENTS 6,766,180 B1 * 7/2004 Doraiswamy et al. ... 455/575.1
6,886,221 B1 * 5/2005 Minami et al. ............... 16/324
2003/0101538 A1 * 6/2003 Koshikawa .................. 16/277
2004/0142735 A1 * 7/2004 Yi ............................. 455/575.3
2004/0181909 A1 * 9/2004 Kawamoto .................... 16/330
2005/0220294 A1 * 10/2005 Gupte .................... 379/433.13

FOREIGN PATENT DOCUMENTS

GB         2299371 A    * 10/1996

* cited by examiner

*Primary Examiner*—Chuck Y. Mah
*Assistant Examiner*—Mark T. Vogelbacker
(74) *Attorney, Agent, or Firm*—Snell & Wilmer L.L.P.

(57) ABSTRACT

An adjustable hinge device is provided for a foldable apparatus in accordance with the present invention. The foldable apparatus, such as a portable mobile phone, comprises a cover and a body connected by the hinge so as to make the cover rotatable relative to the body between a fully opened position and a fully closed position. When the cover rotates to the fully opened position, a maximum opening angle is defined. According to the relative movement between a rotatable portion and a fixed portion of the adjustable hinge, the maximum opening angle can be adjusted to fit different requirements.

14 Claims, 6 Drawing Sheets

ADJUSTABLE HINGE

CROSS-REFERENCE TO RELATED APPLICATIONS

This Application claims the right of priority based on Taiwan Patent Application No. 093113829 entitled "ADJUSTABLE HINGE," filed on May 17, 2004.

FIELD OF THE INVENTION

This invention relates to an adjustable hinge for use in a foldable apparatus, more particularly, an adjustable hinge including a rotatable portion and a fixed portion, wherein adjusting the relative position between the rotatable portion and the fixed portion can adjust a maximum opening angle to satisfy different user demands.

BACKGROUND OF THE INVENTION

A hinge is often used to connect a cover with the body of a foldable apparatus. There are many foldable mobile phones using hinges to connect their bodies and covers. A foldable mobile phone usually has a smaller volume than others not foldable.

In the prior art, the maximum opening angle, defined by the cover and the body, is not adjustable. According to different demands of various users, for example, different users having different facial sizes, an adjustable maximum opening angle is required to accommodate the various users.

SUMMARY OF THE INVENTION

The present invention provides an adjustable hinge for use in a foldable apparatus. The foldable apparatus herein can be a foldable mobile phone. Through adjusting the relative position between the rotatable portion and the fixed portion of the foldable apparatus, an adjustable maximum opening angle can be achieved to satisfy different user demands.

The present invention also provides an adjustable hinge for use in a mobile phone. Through adjusting the relative position between the rotatable portion and the fixed portion of the mobile phone, an adjustable maximum opening angle can be achieved to satisfy different user demands.

The present invention also provides a connection method for a cylinder and a shaft, both included in the adjustable hinge, to avoid detaching the cylinder from the hinge directly during an adjusting process.

DETAILED DESCRIPTION

Figure 1A:
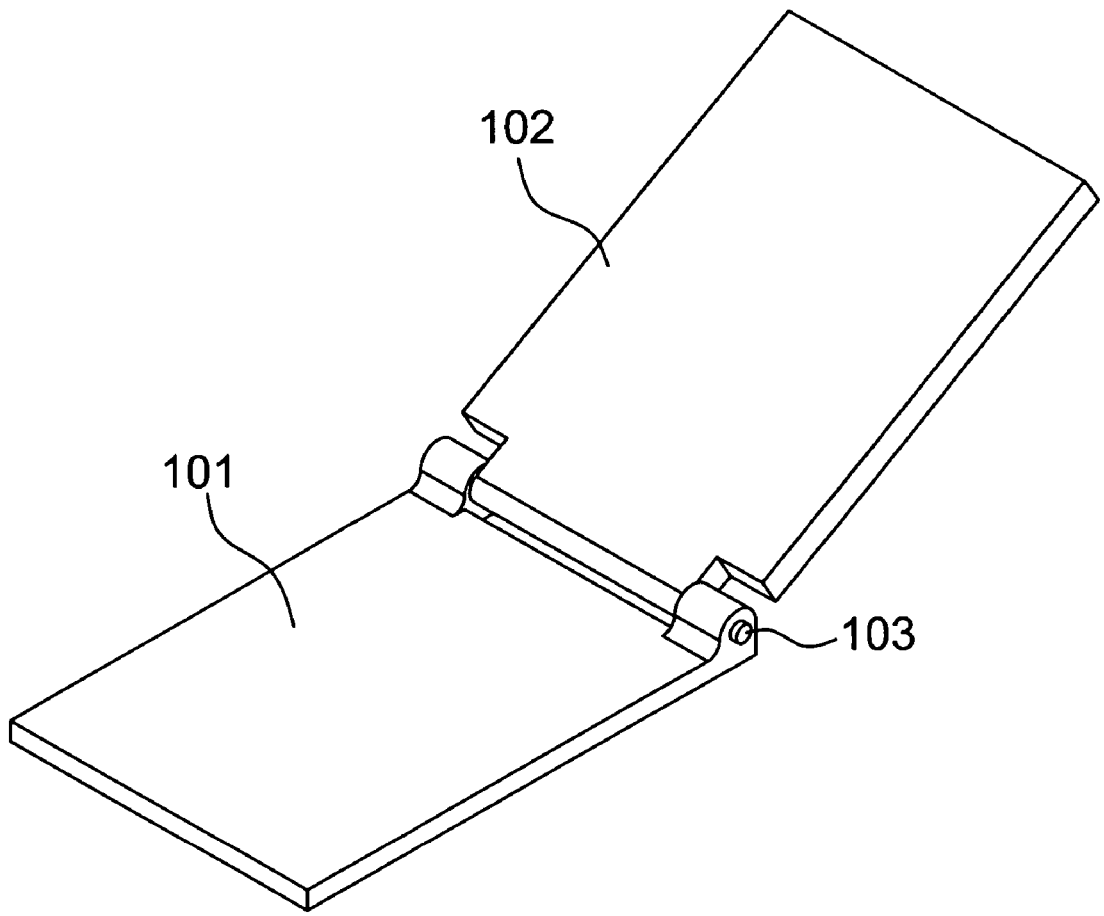
FIG. 1a is a schematic view of a foldable apparatus.
Figure 1B:
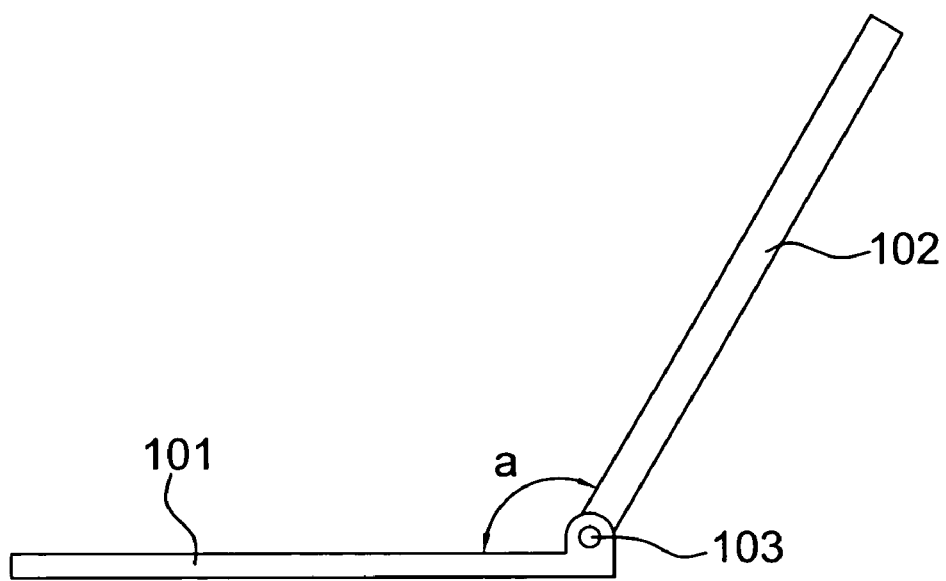
FIG. 1b is a side view of the foldable apparatus.
Figure 1C:
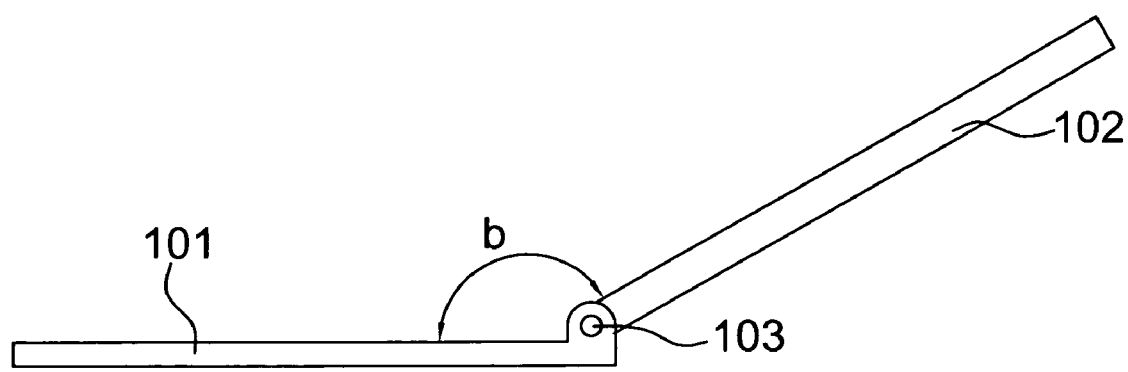
FIG. 1c is a side view of the foldable apparatus.

An adjustable hinge for use in a foldable apparatus is provided. The foldable apparatus herein can be a mobile phone. As shown in FIG. 1a, the foldable apparatus 10 includes a cover 102, a body 101 and an adjustable hinge 103. The adjustable hinge 103 connects with the cover 102 and the body 101 to allow the cover 102 and the body 101 to open or fold according to a user's demand. As shown in FIG. 1b, when the cover rotates, relative to the body 101, to a fully open position, a maximum opening angle "a" is defined. As shown in FIG. 1c, after the adjustment by the adjustable hinge 103 (how to adjust will be elaborated below), the value of the maximum opening angle has changed to "b (b>a)." Thus, the maximum opening angle can be changed to fit different requirements.

Figure 1D:
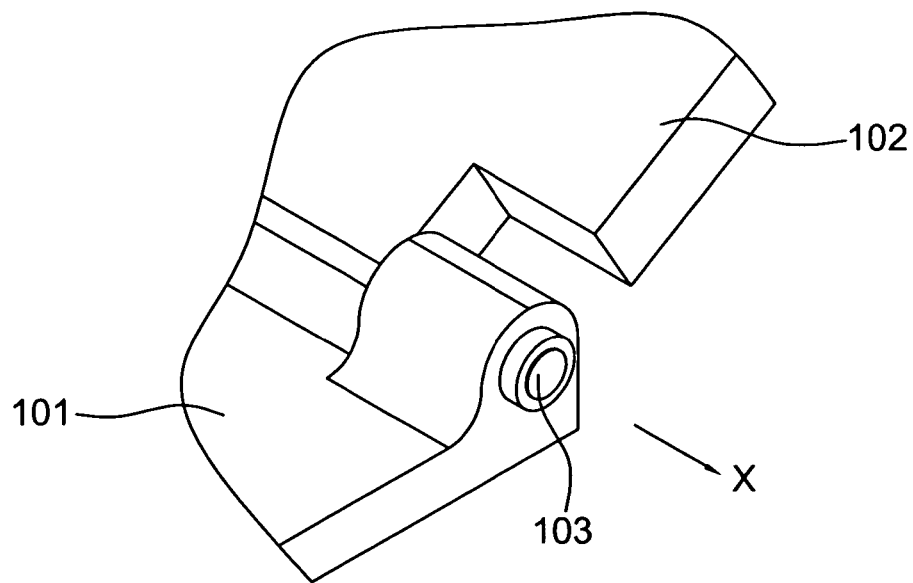
FIG. 1d is a schematic view illustrating how an adjustable hinge works in the foldable apparatus.
Figure 1E:
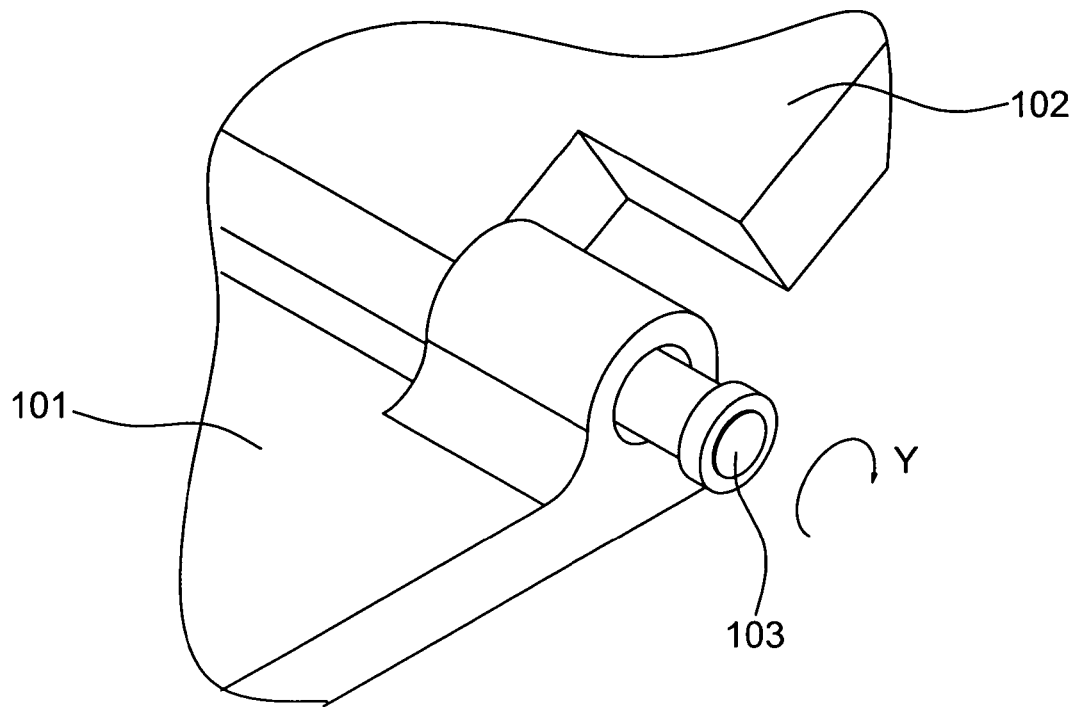
FIG. 1e is another schematic view illustrating how an adjustable hinge works in the foldable apparatus.

Referring now to both FIGS. 1d and 1e, the foldable apparatus 10 of the present invention includes a cover 102, a body 101 and an adjustable hinge 103. In FIG. 1d, the maximum opening angle of the foldable apparatus 10 is fixed. When the user wants to adjust the maximum opening angle, he has to pull the adjustable hinge along the direction X depicted in FIG. 1d. Then the user has to rotate the adjustable hinge 103 following the direction Y (or the opposite direction) depicted in FIG. 1e to adjust the maximum opening angle. The details of the adjustable hinge 103 will be described below.

Figure 1F:
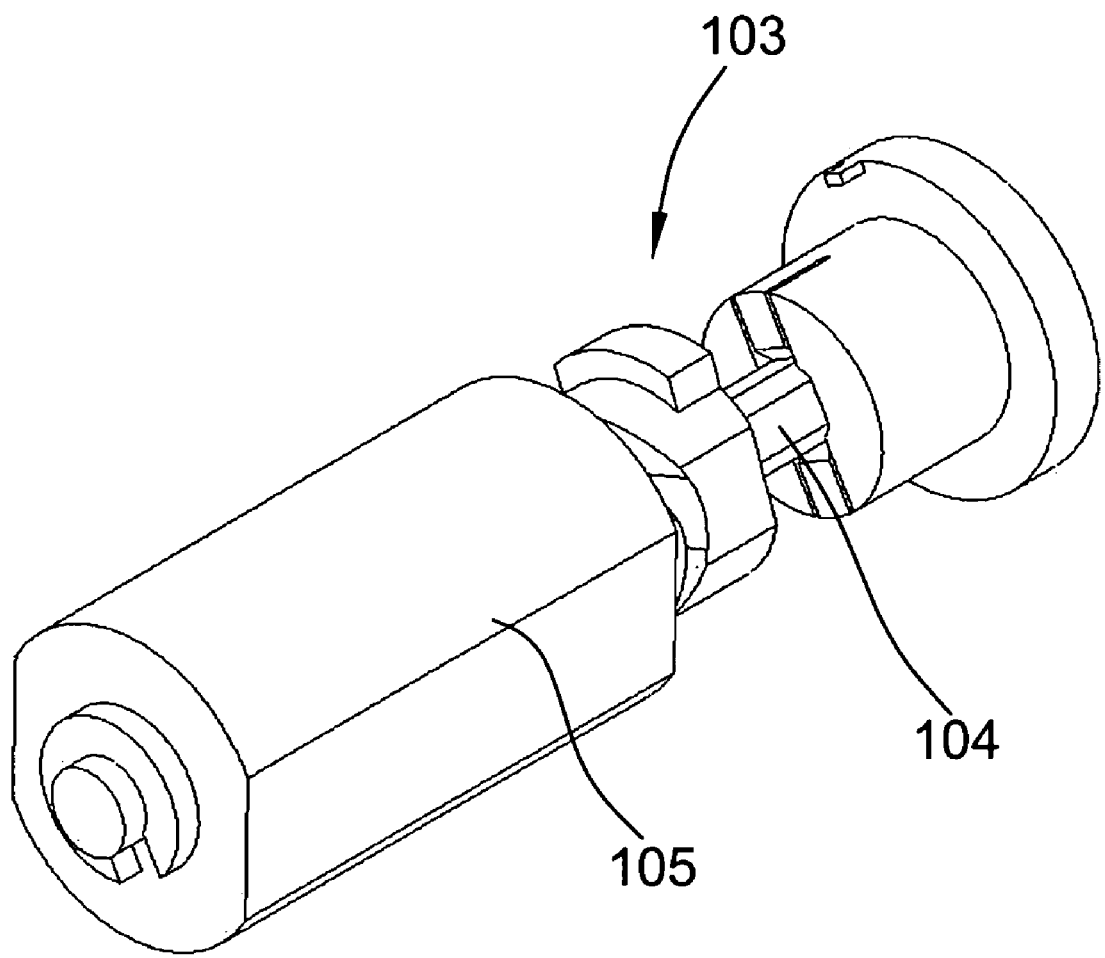
FIG. 1f is a schematic view illustrating an adjustable hinge in accordance with an embodiment of the present invention.

FIG. 1f is a schematic view of an adjustable hinge of an embodiment of the present invention. Now referring to FIG. 1f, the adjustable hinge 103 includes a fixed portion 105 and a rotatable portion 104. The fixed portion 105 is fixedly attached to the body 101 and the rotatable portion 104 can rotate relative to the body 101. It should be noted that the adjustable hinge of the present invention is not limited to that as shown in FIG. 1f.

Figure 2:
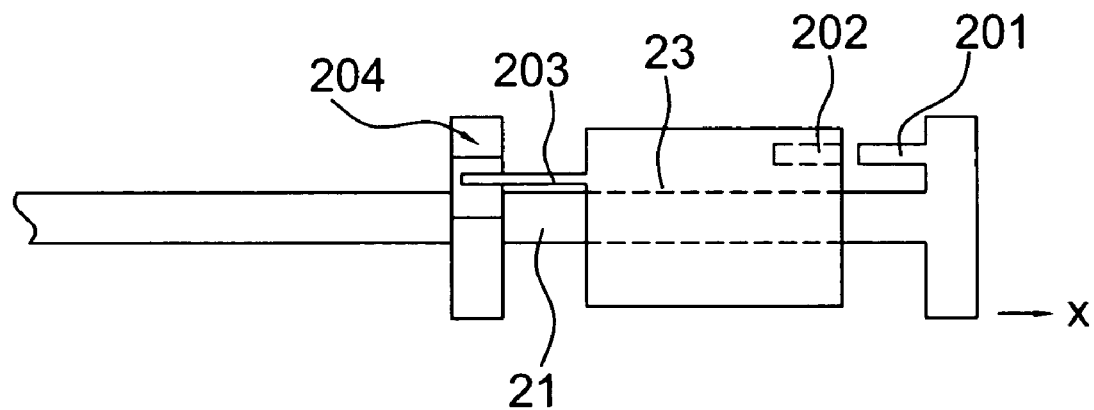
FIG. 2 is a side view illustrating an adjustable hinge in accordance with an embodiment of the present invention.

FIG. 2 is a side view of an adjustable hinge in accordance with an embodiment of the present invention. As shown in FIG. 2, the adjustable hinge includes a fixed portion 23 and a rotatable portion 21. The rotatable portion 21 includes a first protrusion portion 201 and defines a space 204. The fixed portion 23 connects with the body (not illustrated). The fixed portion 23 includes a second protrusion portion 203 and defines a recess 202. When the first protrusion portion 201 is disposed in the recess 202, the rotatable portion 21 and the fixed portion 23 cannot have any relative movement and the maximum opening angle cannot be adjusted. When the user pulls the rotatable portion 21 out of the fixed portion 23 (along x direction depicted in FIG. 2), then the first protrusion portion 201 is outside the recess 202 and the user can adjust the maximum opening angle. After the user has finished the adjustment, he only has to put the first protrusion portion 201 into the recess 202, and then the maximum opening angle value will be fixed again.

Figure 3:
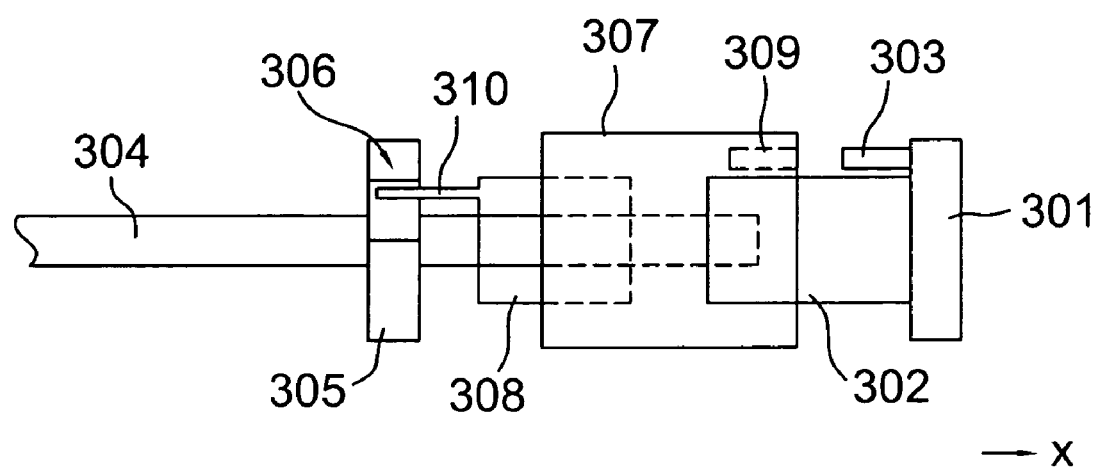
FIG. 3 is a side view illustrating an adjustable hinge in accordance with another embodiment of the present invention.
Figure 4:
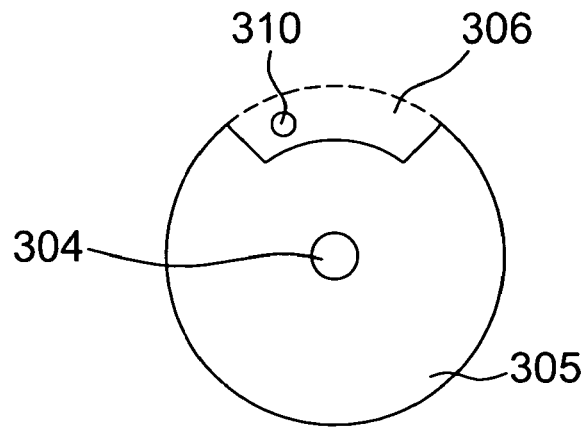
FIG. 4 is a schematic view illustrating a ring in accordance with an embodiment of the present invention.

Referring now to FIG. 3, the adjustable hinge 103 includes a cap 301, a cylinder 302, a shaft 304, a ring 305, a holder 307 and a cam 308. The cap 301 includes a first protrusion portion 303 and the holder 307 defines a recess 309. The first protrusion portion 303 can be disposed in the recess 309. When the first protrusion portion 303 is disposed in the recess 309, the maximum opening angle, defined by the cover and the body, is not adjustable. On the contrary, when the first protrusion portion 303 is outside the recess 309, the maximum opening angle can be adjusted according to different requirements. As shown in FIG. 3, the cam 308 includes a second protrusion portion 310 and the ring 305 defines a space 306. Referring to FIG. 4, the second protrusion portion 310 is inside the space 306. The space 306 provides the second protrusion portion 310 with a limit room to adjust the maximum opening angle by changing the relative position of the second protrusion portion 310 in the space 306. The size of the space 306 determines the adjusting range of the maximum opening angle. The more the second protrusion portion can move in the space 306, the wider range the maximum angle can be adjusted.

As shown in FIG. 3, the cap 301, the cylinder 302, the shaft 304 and the ring 305 can rotate relative to the body 101 (these parts are functionally similar to the rotatable portion 21 as shown in FIG. 2), and the holder 307 and the cam 308 are fixedly attached to the body 101 (these two parts are functionally similar to the fixed portion 23 as shown in FIG. 2).

Referring to the embodiment as shown in FIG. 3, the user pulls the cap 301 and cylinder 302 out of the holder 307 (along x direction depicted in FIG. 3), then the first portion 303 is outside the recess 309 and the user can adjust the maximum opening angle. After the user has finished his adjustment, he only has to put the cap 301 and cylinder 302 into the recess 309, and then the maximum opening angle value will be fixed again.

Figure 5:
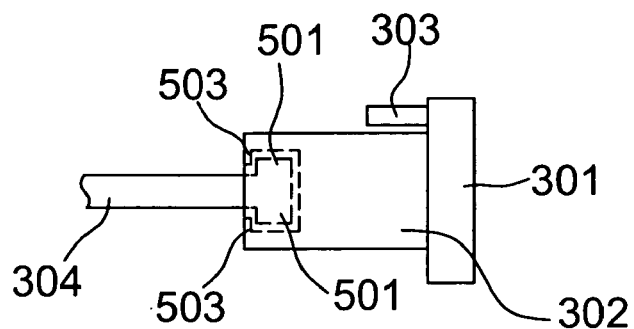
FIG. 5 is a schematic view illustrating how to prevent accidental separation of a cylinder of the present invention.

Referring now to FIG. 5, the cylinder 302 includes a hook 503, and one end of the shaft 304 includes a third protrusion portion 501. The hook 503 is used to join the third protrusion portion 501 of the shaft 304 to avoid detaching the cylinder 302 accidentally from the adjustable hinge, when the user tries to pull out the cylinder 302. In other embodiments, similar methods can provide the same function, for example by increasing the friction force between the cylinder 302 and the shaft 304.

Referring back to FIG. 2, the fixed portion 23 connects with the body (not illustrated) by utilizing at least one latch (not illustrated) and at least one corresponding trench (not illustrated). The latch is disposed on the fixed portion 23, and the trench is disposed on the body. However, in another embodiment of FIG. 3, the latch can be disposed on the holder 307 and the trench is disposed in the body.

Figure 6:
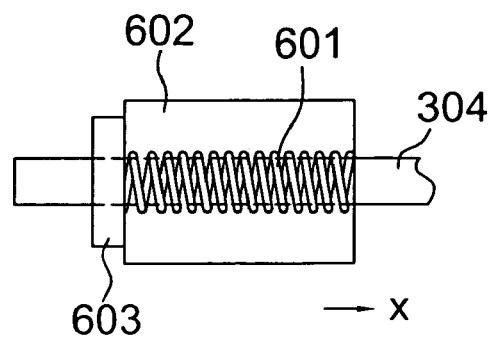
FIG. 6 is a schematic view illustrating a resilient member in accordance with the embodiment of the present invention.

In the embodiment of FIG. 3, the adjustable hinge of the present invention further includes a resilient member 601. Referring to FIG. 6, the resilient member 601 provides a resilient force to maintain the relative position between the cam (not illustrated) and the holder (not illustrated). The adjustable hinge of the present invention can further include a sleeve 602 and a fixing ring 603 to use with the resilient member 601. As shown in FIG. 6, the sleeve 602 covers the resilient member 601, and the fixing ring 603 connects with one end of the shaft to get some support. When the resilient member 601 connects with the cam (not illustrated) along the x direction, the resilient member 601 provides a resilient force to maintain the relative position between the cam and the holder to ensure the adjustable hinge works in normal condition.

While the invention has been described in connection with what is presently considered to be the most practical and preferred embodiments, it is to be understood that the invention is not to be limited to these embodiments. The invention is intended to cover various modifications and equivalent arrangements within the spirit and scope of the appended claims.

What is claimed is:

1. An adjustable hinge device for use in a foldable apparatus, the foldable apparatus including a cover and a body, the cover connected with the body by the adjustable hinge, the cover rotating relative to the body to a fully opened position and thereby defining a maximum opening angle, the adjustable hinge device comprising:
   a rotatable portion capable of rotating relative to the body, comprising:
      a cap having a first protrusion portion;
      a cylinder, the cap sleeving to the cylinder;
      a ring defining a space; and
      a shaft connected with the ring and the cylinder respectively; and
   a fixed portion fixedly attached to the body, comprising:
      a holder connected with the body, the holder sleeving to the cylinder and defining a recess, the first protrusion portion being selectively disposed in the recess; and
      a cam having a second protrusion portion connected with the holder, the second protrusion portion selectively received in the space;
   wherein, when there is a relative movement between the rotatable portion and the fixed portion, the maximum opening angle can be adjusted.

2. The adjustable hinge device according to claim 1, wherein the space receives the second protrusion portion and the shaft connects with the cam, and when the first protrusion portion is outside the recess, adjusting the relative position between the second protrusion portion and the ring in the space can adjust the maximum opening angle.

3. The adjustable hinge device according to claim 2, wherein when the ring and the cylinder are pulled out of the holder, the first protrusion portion is outside the recess and the maximum opening angle can be adjusted.

4. The adjustable hinge device according to claim 2, wherein the cylinder includes a hook for connecting with a third protrusion portion of the shaft to avoid detaching the cylinder from the holder while the cylinder is pulled out.

5. The adjustable hinge device according to claim 2, further comprising a resilient member providing a resilient force to maintain the relative position between the cam and the holder.

6. The adjustable hinge device according to claim 5, further comprising a sleeve and a fixing ring, the sleeves covering the resilient member and the fixing ring being connected with one end of the shaft to maintain the relative position between the resilient member and the shaft.

7. A foldable mobile device, including a cover, a body and a adjustable hinge, the cover connected with the body by the adjustable hinge, the cover rotating relative to the body to a fully opened position and defining a maximum opening angle, the adjustable hinge device comprising:
   a cap having a first protrusion portion;
   a cylinder, the cap sleeving to the cylinder;
   a holder connected with the body, the holder sleeving to the cylinder and defining a recess, the first protrusion portion being selectively disposed in the recess;
   a cam having a second protrusion portion connected with the holder;
   a ring defining a space to receive the second protrusion portion; and
   a shaft connected with the ring, the cam, and the cylinder respectively;

wherein, when the first protrusion portion is outside the recess, adjusting the relative position between the second protrusion portion and the ring in the space can adjust the maximum opening angle.

8. The adjustable hinge device according to claim 7, wherein when the ring and the cylinder are pulled out of the holder, the first protrusion portion is outside the recess and the maximum opening angle can be adjusted.

9. The adjustable hinge device according to claim 7, wherein the cylinder includes a hook to connect with a third protrusion portion of the shaft in order to avoid detaching the cylinder from the holder while the cylinder is pulled out.

10. The adjustable hinge device according to claim 7, further comprising a resilient member for providing a resilient force to maintain the relative position between the cam and the holder.

11. The adjustable hinge device according to claim 10, further comprising a sleeve and a fixing ring, the sleeves covering the resilient member and the fixing ring being connected with one end of the shaft to maintain the relative position between the resilient member and the shaft.

12. An adjustable hinge for use in a foldable mobile device, the foldable mobile device including a cover and a body, the cover connected with the body by the adjustable hinge, the cover capable of rotating relative to the body to a fully opened position and defining a maximum opening angle, the adjustable hinge device comprising:

a cap having a first protrusion portion;

a cylinder having a hook, the cap sleeving to the cylinder;

a holder connected with the body, the holder sleeving to the cylinder and defining a recess, the first protrusion portion being selectively disposed in the recess;

a cam having a second protrusion portion connected with the holder;

a ring defining a space to receive the second protrusion portion; and a shaft connected with the ring and the cylinder respectively, the shaft having a third protrusion portion connected with the hook to avoid detaching the cylinder from the holder while the cylinder is pulled out of the holder;

wherein, when the ring and the cylinder are pulled out of the holder, the first protrusion portion is outside the recess, adjusting relative position between the second protrusion portion and the ring in the space can adjust the maximum opening angle.

13. The adjustable hinge device according to claim 12, further comprising a resilient member providing a resilient force to maintain the relative position between the cam and the holder.

14. The adjustable hinge device according to claim 13, further comprising a sleeve and a fixing ring, the sleeves covering the resilient member and the fixing ring connected with one end of the shaft to maintain the relative position between the resilient member and the shaft.

* * * * *